(12) United States Patent
Kanemitsu et al.

(10) Patent No.: US 9,686,836 B2
(45) Date of Patent: Jun. 20, 2017

(54) LED DRIVING DEVICE, ILLUMINATOR, AND LIQUID CRYSTAL DISPLAY DEVICE

(71) Applicant: Rohm Co., Ltd., Kyoto (JP)

(72) Inventors: Ryosuke Kanemitsu, Kyoto (JP); Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/187,980

(22) Filed: Jun. 21, 2016

(65) Prior Publication Data

US 2016/0302269 A1    Oct. 13, 2016

Related U.S. Application Data

(63) Continuation of application No. 14/260,153, filed on Apr. 23, 2014, now Pat. No. 9,396,626, which is a continuation of application No. 13/544,537, filed on Jul. 9, 2012, now Pat. No. 8,754,579.

(30) Foreign Application Priority Data

Jul. 11, 2011    (JP) ................. 2011-152975

(51) Int. Cl.
  *H05B 33/08*    (2006.01)
  *G09G 3/34*    (2006.01)
  *G02F 1/1335*    (2006.01)
  *G08B 5/36*    (2006.01)

(52) U.S. Cl.
  CPC ..... *H05B 33/089* (2013.01); *G02F 1/133603* (2013.01); *G08B 5/36* (2013.01); *G09G 3/3406* (2013.01); *H05B 33/0812* (2013.01); *H05B 33/0815* (2013.01); *H05B 33/0818* (2013.01); *H05B 33/0827* (2013.01); *H05B 33/0845* (2013.01); *G02F 2001/133612* (2013.01); *G09G 2330/12* (2013.01)

(58) Field of Classification Search
  None
  See application file for complete search history.

(56) References Cited

U.S. PATENT DOCUMENTS

| | | | |
|---|---|---|---|
| 7,170,768 B2 * | 1/2007 | Heurtier | H03K 17/22 363/127 |
| 7,528,553 B2 | 5/2009 | Ito et al. | |
| 7,791,287 B2 | 9/2010 | Maschietto et al. | |
| 8,120,274 B2 | 2/2012 | Kuo et al. | |

(Continued)

FOREIGN PATENT DOCUMENTS

JP    2007-287617    11/2007

*Primary Examiner* — Crystal L Hammond
(74) *Attorney, Agent, or Firm* — Fish & Richards P.C.

(57) ABSTRACT

The present invention provides a light emitting diode (LED) driving device as a semiconductor device, which comprises: a direct current/direct current (DC/DC) controller, for controlling an output segment that is used to generate an output voltage from an input voltage and supply the output voltage to an LED; an output current driver, for generating an output current of the LED; and an LED short-circuit detection circuit, for monitoring a cathode voltage of the LED to perform an LED short-circuit detection, wherein the LED short-circuit detection circuit controls whether an action is performed or not according to a short-circuit detection enable signal input from outside the LED driving device.

9 Claims, 12 Drawing Sheets

(56) References Cited

U.S. PATENT DOCUMENTS

| | | |
|---|---|---|
| 8,258,711 B2 | 9/2012 | Akiyama et al. |
| 8,269,425 B2 | 9/2012 | Kawata et al. |
| 8,884,627 B2 * | 11/2014 | Minamii .............. H02H 7/1225 |
| | | 307/18 |
| 2008/0231198 A1 | 9/2008 | Zarr |
| 2009/0278471 A1 | 11/2009 | Peng |
| 2010/0176776 A1 | 7/2010 | Wachi |
| 2010/0308655 A1 | 12/2010 | Wachi |
| 2013/0069554 A1 | 3/2013 | Kawata |

* cited by examiner

| LED EN | | LED | | | |
|---|---|---|---|---|---|
| 1 | 2 | 1 | 2 | 3 | 4 |
| L | L | ON | ON | ON | ON |
| H | L | ON | ON | ON | OFF |
| L | H | ON | ON | OFF | OFF |
| H | H | ON | OFF | OFF | OFF |

| PROTECTION FUNCTIONS | DETECTION CONDITION | | ACTION DURING DETECTION |
|---|---|---|---|
| | [DETECTION] | [RELEASE] | |
| UVLO | VIN<3.5V OR VREG<2.0V | VIN>4.05V OR VREG>3.5V | SHUTDOWN OF ALL BLOCKS (EXCEPT REG) |
| TSD | Tj>175°C | Tj<150°C | SHUTDOWN OF ALL BLOCKS (EXCEPT REG) |
| OVP | VOVP>2.0V | VOVP<1.45V | SS EXTRACTING |
| OCP | VCS≦VCC-0.6V | VCS>VCC-0.6V | SS EXTRACTING |
| SCP | V1~V4<0.3V (100ms delay, 300kHz) | EN OR UVLO | DELAY TURNING OFF THE LOCKOUT OF THE COUNTER (EXCEPT REG) |
| LED OPEN-CIRCUIT PROTECTION | V1~V4<0.3V & VOVP>1.7V | EN OR UVLO | ONLY DETECTING LED CHANNEL TURNED OFF (TURNING OFF LOCKOUT) |
| LED SHORT-CIRCUIT PROTECTION | V1~V4>4.5V & VOVP<1.6V (100ms delay, 300kHz) | EN OR UVLO | ONLY DETECTING LED CHANNEL TURNED OFF (TIMER DELAYS TURNING OFF LOCKOUT) |

FIG. 5

LED DRIVING DEVICE, ILLUMINATOR, AND LIQUID CRYSTAL DISPLAY DEVICE

BACKGROUND OF THE INVENTION

1. Field of the Invention

The present invention relates to a Light Emitting Diode (LED) driving device for performing LED driving control, and an illuminator and a Liquid Crystal Display (LCD) device using the LED driving device.

2. Description of the Related Art

In recent years, LEDs requiring low energy consumption and sustaining long service life have gradually gained prominence as a substitute for filament lamps and fluorescent lamps and are used for an increasing variety of purposes.

Patent Document 1 can be taken as an example of the relevant prior art.

PRIOR ART DOCUMENT

Patent Document 1: Japanese Patent Publication No. 2007-287617

SUMMARY OF THE INVENTION

Problems to be Solved by the Invention

Various problems need to be addressed by an LED driving control device, for example, output charge residual during shutdown, malfunction of an LED short-circuit detection function, and so on.

One of the various technical features disclosed in this specification is an LED driving device capable of quickly eliminating the output charge residual during shutdown, and an illuminator and an LCD device using the LED driving device (the first objective).

A second of the various technical features disclosed in this specification is to provide an LED driving device capable of eliminating malfunction of the LED short-circuit detection function, and an illuminator and an LCD device using the LED driving device (the second objective).

Technical Means for Solving the Problems

First Technical Feature

In order to achieve the first objective, an LED driving device of the first technical feature is provided, which comprises: a direct current/direct current (DC/DC) controller, for controlling an output segment that is used to generate an output voltage from an input voltage and supply the output voltage to an LED; an output current driver, for generating an output current of the LED; and an output discharging circuit, for performing, based on a predetermined control signal, discharging of an output voltage when a generation action of the output voltage and an output current stops (structure 1-1).

In the LED driving device having the structure 1-1, the output discharging circuit includes a first N-channel field effect transistor (FET) that connects/disconnects an applied end of the output voltage and a ground end according to the control signal applied to a gate thereof (structure 1-2).

In the LED driving device having the structure 1-2, the output discharging circuit further includes a second N-channel FET, a drain of the second N-channel FET is connected to the applied end of the output voltage, a source thereof is connected to a drain of the first N-channel FET, and a gate thereof is connected to the gate of the first N-channel FET (structure 1-3).

In the LED driving device having the structure 1-3, the output discharging circuit further includes a Zener diode, a cathode of the Zener diode is connected to the applied end of the control signal, and an anode thereof is connected to the ground end (structure 1-4).

In the LED driving device having the structure 1-4, an upper layer of at least one of the first and second N-channel FETs is stacked with a wiring layer (structure 1-5).

In the LED driving device having any of the structures 1-1 to 1-5, the control signal is an enable signal or a shutdown signal of the LED driving device (structure 1-6).

An illuminator of the first technical feature includes the LED driving device having any of the structures 1-1 to 1-6, an output segment, and an LED (structure 1-7).

An LCD device of the first technical feature includes an LCD panel and the illuminator having the structure 1-7 and illuminating the LCD panel from the back (structure 1-8).

Second Technical Feature

In order to achieve the second objective, an LED driving device of the second technical feature is provided, which comprises: a direct current/direct current (DC/DC) controller, for controlling an output segment that is used to generate an output voltage from an input voltage and supply the output voltage to an LED; an output current driver, for generating an output current of the LED; and an LED short-circuit detection circuit, for monitoring a cathode voltage of the LED to perform an LED short-circuit detection, wherein the LED short-circuit detection circuit controls whether an action is performed or not according to a short-circuit detection enable signal input from outside the LED driving device (structure 2-1).

In the LED driving device having the structure 2-1, the LED short-circuit detection circuit includes a comparator, which compares a cathode voltage of an LED and a predetermined threshold voltage (structure 2-2).

In the LED driving device having the structure 2-2, the comparator controls whether the action is performed or not according to a short-circuit detection enable signal (structure 2-3).

In the LED driving device having the structure 2-2, the LED short-circuit detection circuit further includes a logic gate, which masks an output signal of the comparator according to the short-circuit detection enable signal (structure 2-4).

An illuminator of the second technical feature includes the LED driving device having any of the structures 2-1 to 2-4, an output segment, and the LED (structure 2-5).

An LCD device of the second technical feature includes an LCD panel and the illuminator having the structure 2-5 and illuminating the LCD panel from the back (structure 2-6).

Effects of the Invention

According to the first technical feature, an LED driving device capable of quickly eliminating output charge residual during shutdown, and an illuminator and an LCD device using the LED driving device are provided.

Moreover, according to the second technical feature, an LED driving device capable of eliminating malfunction of an LED short-circuit detection function, and an illuminator and an LCD device using the LED driving device are provided.

BRIEF DESCRIPTION OF THE DRAWINGS

FIG. 5 is a list of protection functions of an LED driver IC 100;

DETAILED DESCRIPTION OF THE INVENTION

<Block Diagram (First Structural Embodiment)>

Figure 1:
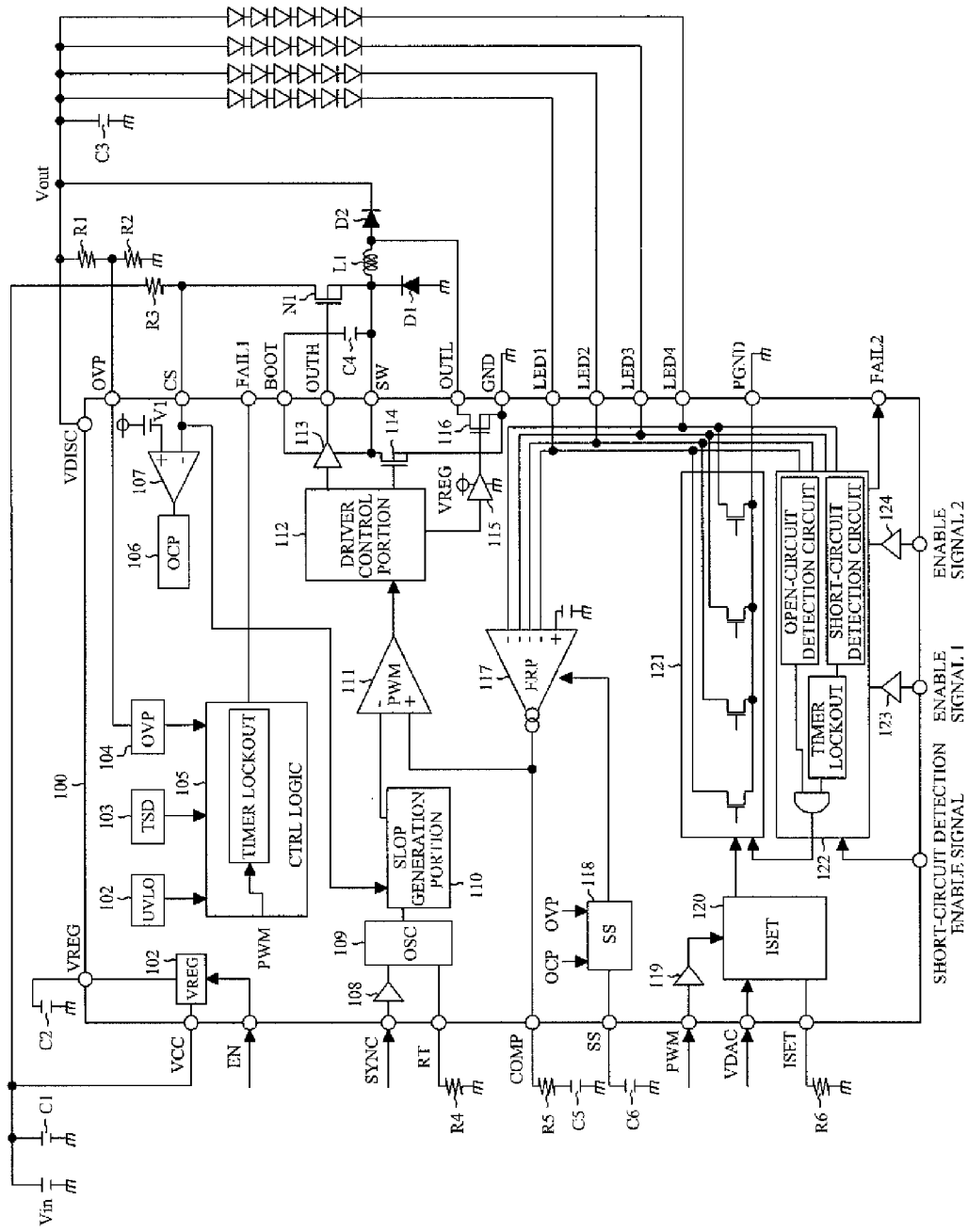
FIG. 1 is a circuit block diagram of a first structural embodiment of an LED driver integrated circuit (IC) (boost-buck application structural embodiment)

FIG. 1 is a circuit block diagram of a first structural embodiment of an LED driver IC (boost-buck application structural embodiment) according to the present invention. An LED driver IC 100 of this embodiment is a semiconductor device, and includes an internal constant voltage generation portion 101, an Under Voltage Lock Out (UVLO) portion 102, a Thermal Shut Down (TSD) portion 103, an Over Voltage Protection (OVP) portion 104, a logic control portion 105, an Over Current Protection (OCP) portion 106, a comparator 107, a Schmitt trigger 108, an oscillation portion 109, a slope generation portion 110, a Pulse Width Modulation (PWM) comparator 111, a driver control portion 112, an upper driver 113, an N-channel metal oxide semi-conductor (MOS) FET 114, a lower driver 115, an N-channel MOS FET 116, an error amplifier 117, a slow start portion 118, a Schmitt trigger 119, an output current setting portion 120, a constant current driver 121, an open-circuit/short-circuit detection portion 122, and Schmitt triggers 123 and 124.

In this manner, a switch power source IC, a microcomputer/counter Large Scale Integrated Circuit (LSI), and a discrete protection circuit that are originally mounted separately on a substrate are gathered onto the single-chip LED driver IC 100, so as to reduce the area of the substrate and decrease the percentage of defective products. In addition, through the reduction in area of the substrate, the varied light source design can be realized agilely.

Moreover, in order to establish an electrical connection to the outside of the IC, the LED driver IC 100 includes 28 external terminals (COMP, SS, EN, RT, SYNC, SHDETEN, GND, PWM, FAIL1, FAIL2, LEDEN1, LEDEN2, LED1, LED2, LED3, LED4, OVP, VDAC, ISET, PGND, VDISC, OUTL, SW, OUTH, CS, BOOT, VREG, and VCC).

The internal constant voltage generation portion 101 generates an internal constant voltage VREG (for example, 5 V) from an input voltage Vin applied to a VCC terminal.

The UVLO portion 102 shuts down circuits except the internal constant voltage generation portion 101 when the input voltage Vin becomes lower than 3.5 V or the internal constant voltage VREG becomes lower than 2.0 V.

The TSD portion 103 shuts down the circuits except the internal constant voltage generation portion 101 when the junction temperature of the LED driver IC 100 becomes higher than 175° C. Further, the TSD portion 103 restores the circuit action when the junction temperature of the LED driver IC 100 becomes lower than 150° C.

The OVP portion 104 detects a DC/DC output voltage Vout according to an OVP terminal voltage, and performs the over voltage protection when the OVP terminal voltage becomes higher than 2.0 V. After the over voltage protection is performed, an SS terminal capacitor C6 is discharged, and a DC/DC switch is turned off.

The logic control portion 105 has a function of monitoring a detection status of various protection circuit portions to output a failure detection signal at a FAIL1 terminal, and a lockout function of a timer of external PWM signals.

The OCP portion 106 detects a current flowing in a power FET (the transistor N1) to be used as a voltage signal (the CS terminal voltage) by using a high-voltage side detection resistor R3, and when the CS terminal voltage becomes lower than VCC-0.6 V, performs the subsequent over current protection. After the over current protection is performed, the SS terminal capacitor C6 is discharged, and the DC/DC switch is turned off.

The comparator 107 compares the CS terminal voltage input to an inverting input end (−) with a predetermined reference voltage (VCC-V1) input to a non-inverting input end (+), and outputs a comparison result to the OCP portion 106.

The Schmitt trigger 108 transfers an input signal of a SYNC terminal to the oscillation portion 109.

The oscillation portion 109 generates a predetermined clock signal according to the input signal of the SYNC terminal or a terminal voltage of an RT terminal, and outputs the predetermined clock signal to the slope generation portion 110.

The slope generation portion 110 generates a slope signal (a triangular wave signal) based on the clock signal input from the oscillation portion 109, and outputs the slope signal to the PWM comparator 111. Moreover, the slope generation portion 110 further has a function of giving the slope signal an offset according to the CS terminal voltage (equivalent to a switch current flowing in the transistor N1).

The PWM comparator 111 compares an error signal input to the non-inverting input end (+) with the slope signal input to the inverting input end (−), generates an internal PWM signal, and outputs the internal PWM signal to the driver control portion 112.

The driver control portion 112 generates a driving signal of the upper driver 113, the transistor 114 and the lower driver 115 based on the internal PWM signal.

The upper driver 113 enables an OUTH terminal voltage (a gate voltage of the transistor N1) to fall between a BOOT terminal voltage and an SW terminal voltage based on the driving signal input from driver control portion 112, so as to perform pulse driving.

The transistor 114 is on/off based on the driving signal input from the driver control portion 112, so as to connect/disconnect the SW terminal and a GND terminal.

The lower driver 115 enables a gate voltage of the transistor 116 to fall between the internal constant voltage VREG and a ground voltage based on the driving signal input from the driver control portion 112, so as to perform pulse driving.

The transistor 116 is on/off based on the gate voltage input from the lower driver 115, so as to connect/disconnect an OUTL terminal and the GND terminal.

The error amplifier 117 amplifies a difference between a minimum value of LED terminal voltages VLED1 to VLED4 respectively applied to the inverting input ends (−) of four systems and a reference voltage Vref applied to the non-inverting input end (+), generates an error signal, and outputs the error signal to the PWM comparator 111.

The slow start portion 118 controls the error amplifier 117 by means of slowly increasing a voltage level of the error signal according to an SS terminal voltage.

The Schmitt trigger 119 transfers an input signal of the PWM terminal (an external PWM signal) to the output current setting portion 120.

The output current setting portion 120 sets an output current ILED flowing in LED rows LED1 to LED4. The output current setting portion 120 can perform PWM dimming control by using the PWM terminal or linear dimming control by using a VDAC terminal, and use either the PWM dimming control or the linear dimming control as dimming control of the LED rows LED1 to LED4.

The constant current driver 121 generates the output current ILED flowing in the LED rows LED1 to LED4 based on an instruction from the output current setting portion 120.

The open-circuit/short-circuit detection portion 122 has the following functions: detecting LED open-circuit and LED short-circuit, outputting a failure protection signal to the constant current driver 121, and outputting a failure detection signal at a FAIL2 terminal. Moreover, the open-circuit/short-circuit detection portion 122 further has an enable/disable switching function of the short-circuit detection function based on an input signal of a SHDETEN terminal.

The Schmitt trigger 123 transfers an input signal of a LEDEN1 terminal to the open-circuit/short-circuit detection portion 122.

The Schmitt trigger 124 transfers an input signal of a LEDEN2 terminal to the open-circuit/short-circuit detection portion 122.

<Boost-Buck Application Structure>

In the boost-buck application structure shown in FIG. 1, an LED driver IC 100 is externally connected to an N-channel MOS FET N1, resistors R1 to R6, capacitors C1 to C6, diodes D1 and D2, an inductor L1, and LED rows LED1 to LED4.

A drain of the transistor N1 is connected to a CS terminal and a first end of the resistor R3. A second end of the resistor R3 is connected to an applied end of an input voltage Vin. A source and a back gate of the transistor N1 are connected to an SW terminal. A gate of the transistor N1 is connected to an OUTH terminal. A cathode of the diode D1 is connected to the SW terminal. An anode of the diode D1 is connected to a ground end. A first end of the inductor L1 is connected to the SW terminal. A second end of the inductor L1 is connected to an anode of the diode D2 and an OUTL terminal. A cathode of the diode D2 is connected to anodes of the LED rows LED1 to LED4 and a VDISC terminal. Cathodes of the LED rows LED1 to LED4 are respectively connected to terminals LED1 to LED4. The resistors R1 and R2 are connected in series between the VDISC terminal and the ground terminal. A connecting node between the resistors R1 and R2 is connected to an OVP terminal. The capacitor C1 is connected between the applied end of the input voltage Vin and the ground end. The capacitor C2 is connected between a VREG terminal and the ground end. The capacitor C3 is connected between the anodes of the LED rows LED1 to LED4 and the ground end. The capacitor C4 is connected between a BOOT terminal and the SW terminal. A GND terminal and a PGND terminal are connected to the ground end. A VCC terminal is connected to the applied end of the input voltage Vin. An RT terminal is connected to the ground end through the resistor R4. A COMP terminal is connected to the ground end through the resistor R5 and the capacitor C5 in series connection. An SS terminal is connected to the ground end through the capacitor C6. An ISET terminal is connected to the ground end through the resistor R6.

<Description of Terminals>

The COMP terminal is an output terminal of the error amplifier. The SS terminal is a connection terminal of a slow start capacitor. An EN terminal is an enable terminal. The RT terminal is a connection terminal of a resistor for setting an oscillation frequency. An SYNC terminal is an input terminal of an external synchronizing signal. The SHDETEN terminal is an input terminal of a short-circuit detection enable signal. The GND terminal is a GND terminal of a small signal portion. The PWM terminal is an input terminal of a PWM dimming signal. A FAIL1 terminal is a failure output terminal. A FAIL2 terminal is an LED open-circuit/short-circuit failure output terminal. An LEDEN1 terminal and an LEDEN2 terminal are LED output enable terminals. The terminals LED1 to LED4 are LED output terminals. The OVP terminal is an over voltage detection terminal. A VDAC terminal is a DC dimmable light input terminal. An ISET terminal is an LED output current setting terminal. The PGND terminal is a GND terminal for LED output. The VDISC terminal is an output voltage discharging terminal. The OUTL terminal is a low voltage FET drain terminal. The SW terminal is a high voltage FET source terminal. The OUTH terminal is a high voltage FET gate terminal. The CS terminal is a terminal for DC/DC output current detection. The BOOT terminal is a high voltage FET driver power source terminal. The VREG terminal is an internal constant voltage terminal. The VCC terminal is an input power source terminal.

<Summary>

The LED driver IC 100 is a 40V white LED driver having a high withstand voltage. The LED driver IC 100 has four inbuilt channels on a single chip for outputting a constant current. The channel can provide a maximum current of 120 mA/ch, and therefore is applicable to driving LEDs with high luminance. The LED driver IC 100 has an inbuilt DC/DC controller corresponding to a boost-buck current mode, and even when a power source voltage changes unstably (for example, when the power source is directly connected to a battery), a stable action can be implemented without being limited by the number of LED segments. The LED driver IC 100 can select either a PWM mode or a linear mode as an LED dimming mode. The output MOSFET portion is mounted into the LED driver IC 100, which facilitates minimizing the area of the substrate.

<Advantages>

The first advantage of the LED driver IC 100 lies in that an input voltage range is controlled at 4.5 V to 30 V. The second advantage lies in the inbuilt DC/DC controller corresponding to the boost-buck current mode. The third advantage lies in that four channels (a maximum current capacity thereof is 120 mA/ch) are mounted into the current driver for driving the LED. The fourth advantage lies in correspondence with the PWM dimming (a minimum pulse width is 1 µs). The fifth advantage lies in achieving an oscillation frequency precision of ±5% (@300 kHz). The sixth advantage lies in various inbuilt protection functions (UVLO, OVP, TSD, OCP, and SCP). The seventh advantage lies in the inbuilt LED failure status detection function (LED open-circuit/short-circuit detection function). The eighth advantage lies in use of a Heat-sink Thin-Shrink Small Outline Package (HTSSOP)-B28 or Very Thin Quad Flat Non-leaded (VQFN)028V5050 for encapsulation.

<Use>

The LED driver IC 100 can be used as a light source driving mechanism for an LCD stereo, or a small-to-medium sized LCD panel.

<5V Constant Voltage (VREG)>

The LED driver IC 100 includes an internal constant voltage generation portion 101 for generating a 5V internal constant voltage VREG from an input voltage Vin applied to the VCC terminal (when EN=H). The internal constant voltage VREG is used as a power source of an internal circuit in the LED driver IC 100, and is further used to fix a terminal to a high level voltage outside the LED driver IC 100. The internal constant voltage VREG is monitored by the UVLO portion 102. When Vin>4.0 V and VREG>3.5 V, an internal circuit starts performing actions; while when Vin<3.5 V or VREG<2.0 V, the internal circuit stops performing actions. In order to stabilize circuit actions, the VREG terminal is desirably connected to a capacitor C2 (for example, 2.2 µf) for phase compensation.

<Constant Current Driver>

When the output current ILED from the constant current driver 121 does not flow in one of the LED output terminals LED1 to LED 4 (and thus the LED rows are not turned on), the LEDEN1 terminal and the LEDEN2 terminal can be used to separately cut off a current output to the LED output terminals LED1 to LED4.

Figures 2, 3:
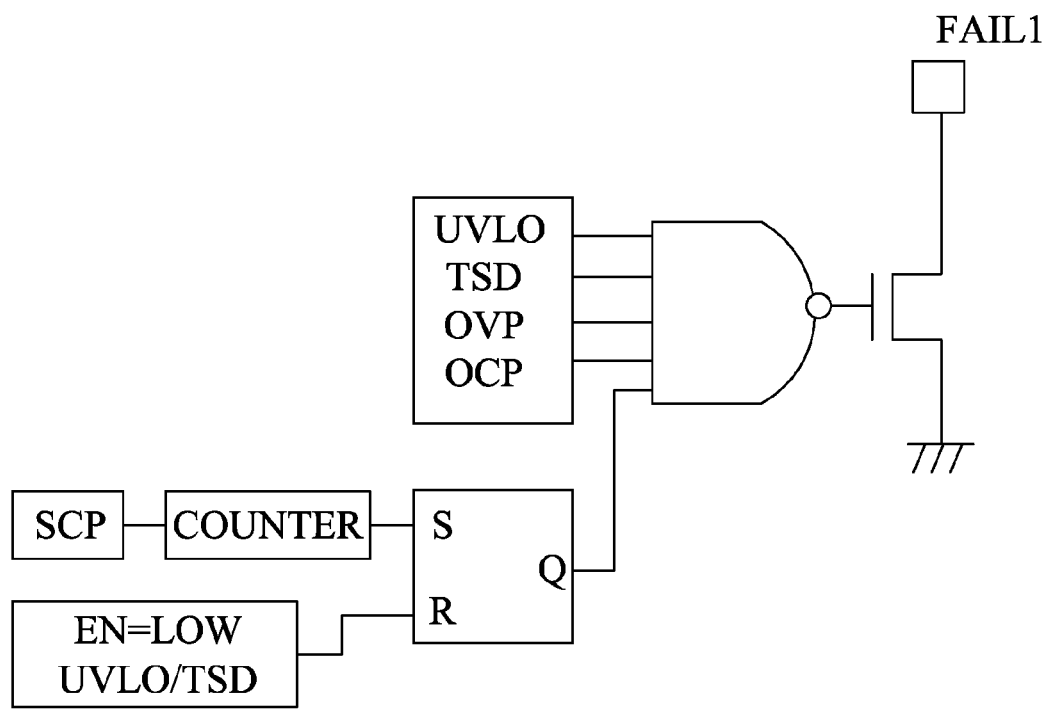
FIG. 2 is a truth table of a correlation between input logic of LED enable signals LEDEN1, LEDEN2 and an on/off status of LED output terminals LED1 to LED4.
FIG. 3 is a block diagram illustrating output functions of FAIL1.

FIG. 2 is a truth table of a correlation between input logic of LED enable signals LEDEN1, LEDEN2 and on/off status of LED output terminals LED1 to LED4.

The LEDEN1 terminal and LEDEN2 terminal are pulled down inside the LED driver IC 100, and both become a low level in an open-circuit status (a status in which the output current ILED flows in the terminals LED1 to LED4). Therefore, under the circumstance that the terminals LED1 to LED4 contain unused terminal, one or both of the LEDEN1 terminal and the LEDEN2 terminal are connected to the VREG terminal, so as to fix the terminal voltage at a high level.

Furthermore, if the LED enable signals LEDEN1 and LEDEN2 are unused, the unused LED output terminal is set to be an open-circuit. In this case, a malfunction is generated in the open-circuit detection of the open-circuit/short-circuit detection portion 122. In another aspect, by using the LED enable signals LEDEN1 and LEDEN2 to separately cut off the current output to the LED output terminal that is not used, the malfunction can be avoided.

<Output Current Setting Method>

The output current ILED flowing in the LED rows LED1 to LED4 is calculated according to the following Formula (1). Further, a parameter such as min[VDAC, 2.0 V] in Formula (1) is the lower of the VDAC terminal voltage and a predetermined constant voltage VISET (which is equal to 2.0 V) inside the output current setting portion 120. Moreover, a parameter such as RISET is a resistance value of the resistor R6, and GAIN is a constant determined inside the circuit of the constant current driver 121.

$$ILED = \min[VDAC, 2.0\ V]/RISET \times GAIN\ [A] \quad (1)$$

That is to say, the ISET terminal is pulled down to be connected to the resistor R6, and a predetermined gain multiple of the reference current ISET flowing in the resistor R6 is set to a maximum value of the output current ILED.

Under the circumstance that the VDAC terminal is used to control the output current ILED, an ideal input range is 0.0 V to 2.0 V. By applying such a voltage, the output current ILED can be decreased from the maximum value gradually. Furthermore, under the circumstance that the VDAC terminal is set to a voltage above 2.0 V, as shown in Formula (1), the value of the constant voltage VISET (which is equal to 2.0 V) is selected. Therefore, the dimming function by use of the VDAC terminal turns to a nonuse status. Under the circumstance that the VDAC terminal is not used, in order to avoid malfunction, the VDAC terminal is desirably not an open-circuit and is connected to the VREG terminal.

<PWM Dimming Control>

Apart from performing the linear dimming control by use of the VDAC terminal, the LED driver IC 100 can also perform the PWM dimming control by use of the PWM terminal. The PWM dimming control is implemented through turning on/off the constant current driver 121 based on the external PWM signal input to the PWM terminal. A duty ratio of the external PWM signal becomes a duty ratio of the output current ILED. Under the circumstance that the PWM dimming is not performed (the duty ratio is 100%), the PWM signal needs only be fixed at a high level (for example, the constant voltage VREG).

<DC/DC Controller>

A DC/DC controller block of the LED driver IC 100 is described in detail hereinafter (which includes circuit blocks of the oscillation portion 109, the slope generation portion 110, the PWM comparator 111, the driver control portion 112, the upper driver 113, the transistor 114, the lower driver 115, the transistor 116, the error amplifier 117, and the slow start portion 118).

The error amplifier 113 amplifies a difference between a lowest value of the LED terminal voltages VLED1 to VLED4 and the reference voltage Vref, to generate an error voltage Verr. When the lowest value of the LED terminal voltages VLED1 to VLED4 is lower than the reference voltage Vref and the difference increases, the level of the voltage value of the error voltage Verr is higher.

The PWM comparator 111 compares the error voltage Verr and a triangular wave voltage Vslp, to generate an internal PWM signal. If the error voltage Verr is higher than the triangular wave voltage Vslp and the difference increases, the level of the internal PWM signal is higher; while if the error voltage Verr is lower than the triangular wave voltage Vslp and the difference increases, the level of the internal PWM signal is lower.

The driver control portion 112 performs on/off control of the transistors N1, 114 and 116 based on the internal PWM signal. Specifically, when the internal PWM signal is at a high level, the driver control portion 112 turns on the transistors N1 and 116, and turns off the transistor 114. In contrast, when the internal PWM signal is at a low level, the driver control portion 112 turns off the transistors N1 and 116, and turns on the transistor 114.

If the transistors N1 and 116 are turned on and the transistor 114 is turned off, a current flows on a path from the applied end of the input voltage Vin to the ground end through the resistor R3, the transistor N1, the inductor L1 and the transistor 116. Electrical energy is accumulated in the inductor L1. At this time, when charges are accumulated in the capacitor C3, the output current ILED flows from the capacitor C3 to the anodes of the LED rows LED1 to LED4. Furthermore, since the diode D2 turns to a reverse biased voltage status, the current does not flow from the capacitor C3 into the transistor 116.

If the transistors N1 and 116 are turned off while the transistor 114 is turned on, due to a counter electromotive force generated by the inductor L1, the current flows on a path from the ground end and passes through the transistor 114, the inductor L1 and the diode D2. The current, as the output current ILED, flows into the LED rows LED1 to LED4, and flows to the ground end through the capacitor C3, so as to charge the capacitor C3.

The above action is performed repeatedly, and the output voltage Vout obtained by boosting and bucking the input voltage Vin is supplied to the LED rows LED1 to LED4.

Furthermore, if the duty ratio of the transistor N1 (a ratio of one cycle to an on-period) is less than 50%, a buck action is performed on the input voltage Vin. If the duty ratio of the transistor N1 is greater than 50%, a boost action is performed on the input voltage Vin. In this way, the LED driver IC 100 can be implemented by a simple structure, and meanwhile, the boost/buck action is switched easily and properly.

Therefore, the LED driver IC 100 can constantly obtain the required output voltage Vout regardless whether the input voltage Vin is higher than or lower than the required output voltage Vout. For example, when a required value of the output voltage Vout is 16 V, under the circumstance that the input voltage Vin varies within the range of 6 to 18 V, the required output voltage Vout can still be obtained. This structure can be used in applications where it is necessary to support the input voltage Vin being directly supplied by a battery (for example, an LED driver IC for controlling a backlight device in a vehicle navigation monitor).

Moreover, in the LED driver IC 100, a switch control mechanism of the transistor 116 not only includes the upper driver 113 that is actuated upon reception of a boost voltage BOOT, but also includes the lower driver 115 that is actuated upon reception of the internal constant voltage VREG. Through such a structure, unnecessary raising of a withstand voltage of the transistor 116 is avoided.

The LED driver IC 100 also includes a ringing prevention mechanism in case the transistor 114 is of a light load or no load. A current capacity of the transistor 114 is desirably designed to be a necessary minimum which does necessitate an undesirable expansion of chip area or decrease in conversion efficiency, and can allow for extraction of a micro current such as a ringing noise. The transistor 114 and the transistors N1 and 116 are under a complementary (exclusive) switch control.

Through such a structure, even if the output current ILED is decreased under a small load or no load and a ringing is generated, which causes chaotic wave forms (the so-called discontinuous mode), the ringing noise can still be dissipated to the ground end through the transistor 114, so as to improve the stability of the boost/buck action.

Furthermore, the terms such as "complementary (exclusive)" used in the specification not only include the case that the on/off status of the transistors N1 and 116 and that of the transistor 114 are completely inverted, but also include the case of setting a period when the transistors N1 and 116 and the transistor 114 are off at the same time, so as to prevent the through current.

<LED Rows>

In the LED driver IC 100, cathode voltages of the LED rows LED1 to LED4 (the LED terminal voltages VLED1 to VLED4) are respectively detected, and the anode voltage of the LED rows LED1 to LED4 (the output voltage Vout) is controlled in a manner of making the lowest value of the cathode voltages consistent with the reference voltage Vref (which is equal to 1.0 V).

For example, under the circumstance that among forward voltage drops VF1 to VF4 of the LED rows LED1 to LED4 (a total value of the forward voltage drops VF of all LED components in all rows), the forward voltage drop VF1 of the LED row LED1 is greatest, among the LED terminal voltages VLED1 to VLED4, the LED terminal voltage VLED1 becomes the lowest value. Therefore, the LED terminal voltage VLED1 becomes a voltage value consistent with the reference voltage Vref (which is equal to 1.0 V), and the LED terminal voltages VLED2 to VLED4 become voltage values higher than the reference voltage Vref.

Furthermore, if the forward voltage drops VF1 to VF4 of all rows have a significant difference, any of the LED terminal voltages VLED1 to VLED4 will be higher than a short-circuit detection voltage VDSHT (which is equal to 4.5 V), leading to an LED short-circuit error detection. Therefore, for the forward voltage drops VF1 to VF4 of all rows, a non-uniform permissible voltage Vper (which is equal to 3.5 V) is set based on the following Formula (2).

$$Vper=VDSHT-Vref \qquad (2)$$

Moreover, when detecting an open-circuit, the open-circuit/short-circuit detection portion 122 sets 85% of an over voltage detection voltage (which is equal to 2.0 V) of the OVP portion 104 to an open-circuit detection voltage (which is equal to 1.7 V). If the open-circuit detection voltage is converted to the output voltage Vout, a maximum value of the output voltage Vout during a normal action becomes 30.6 V (30.6 V=36 V×0.85). Therefore, the number of LED components N in series connection in the LED rows LED1 to LED4 is limited to a value (30.6/VF) which is obtained through dividing the maximum value (30.6 V) less than the output voltage Vout by a forward voltage drop VF of an LED component 1.

<About the OVP Circuit>

A branch voltage of the output voltage Vout extracted from the connecting node between the resistor R1 and the resistor R2 is input to the OVP terminal. The over voltage detection voltage is appropriately determined by referring to the number of LEDs N in series connection in the LED rows and the non-uniform permissible voltage Vper of the forward voltage drops VF. The over voltage detection voltage is also desirably determined by considering the open-circuit detection voltage (which is equal to 85% of the over voltage detection voltage). After the protection action is started, the OVP portion 104 releases the protection action when the output voltage Vout becomes 72.5% of the over voltage detection voltage. If the resistance value of the resistor R1 is set to ROVP1 and the resistance value of the resistor R2 is set to ROVP2, the following Formula (3) is true. Therefore, if it is set that ROVP1=330 kΩ, and ROVP2=22 kΩ, the OVP portion 104 starts the protection action when the Vout is higher than 32 V.

$$Vout \geq \{(ROVP1+ROVP2)/ROVP2\} \times 2.0 \text{ V} \qquad (3)$$

<About the Oscillation Frequency FOSC of the Boost/Buck DC/DC Converter>

Through adjusting the resistance value of the resistor R4 connected to the RT terminal, a current for charging/discharging the internal capacitor of the oscillation portion 109 can be determined, and the oscillation frequency of the slope voltage Vslp is determined (thereby further determining the oscillation frequency FOSC of the boost/buck DC/DC converter). The resistance value of the resistor R4 connected to the RT terminal externally can be set with reference to the following Formula (4).

$$FOSC = (200 \times 10^9 / RT[\Omega]) \times \alpha [\text{kHz}] \qquad (4)$$

Furthermore, in Formula (4), $200 \times 10^9$ [V/A/S] is a constant (±5%) determined inside the circuit, and α is a correction coefficient (RT α=47 kΩ: 0.94, 50 kΩ: 0.98, 60 kΩ: 0.985, 70 kΩ: 0.99, 80 kΩ: 0.994, 90 kΩ: 0.996, 100 kΩ: 1.0, 150 kΩ: 1.01, 200 kΩ: 1.02, 300 kΩ: 1.03, 400 kΩ: 1.04, 500 kΩ: 1.045).

<About the External Synchronizing Oscillation Frequency FSYNC>

The LED driver IC 100 has a SYNC terminal that receives a clock input for external synchronization of the boost/buck DC/DC converter. During clock input to the SYNC terminal, actions such as switching to internal oscillation should not be performed. After the SYNC terminal is switched from high level to low level and is fixed at the low level, a delay of about 30 μsec exists before the oscillation portion 109 is actuated. The clock input to the SYNC terminal is only valid at a rising edge. Moreover, when the external input frequency lags behind the internal oscillation frequency, the oscillation portion 109 is actuated during the delay, and therefore, such an input should be avoided.

As described above, in the LED driver IC 100, by use of the RT terminal or the SYNC terminal, any variable control with high precision can be performed on the oscillation frequency FOSC of the DC/DC converter block. For example, under the circumstance that the LED driver IC 100 is used as a control mechanism of the backlight device in the vehicle navigation monitor, if a proper external synchronizing oscillation frequency FSYNC is set at the SYNC terminal according to the switching control of a radio frequency receiving frequency, the oscillation frequency FOSC of the DC/DC converter block is prevented from overlapping with a band of radio frequency noise, thereby controlling the backlight device of the vehicle navigation monitor without degrading radio frequency reception.

<About the Slow Start SS>

In the LED driver IC 100, by slowly raising the output voltage Vout while limiting the current during the start, overshoot or surge current of the output voltage Vout can be prevented. Moreover, the SS terminal voltage is restored to a low level during the OCP detection and OVP detection, and therefore the switch is turned off; meanwhile a recovery action is started.

<Auto-Diagnosis Function>

Figure 4:
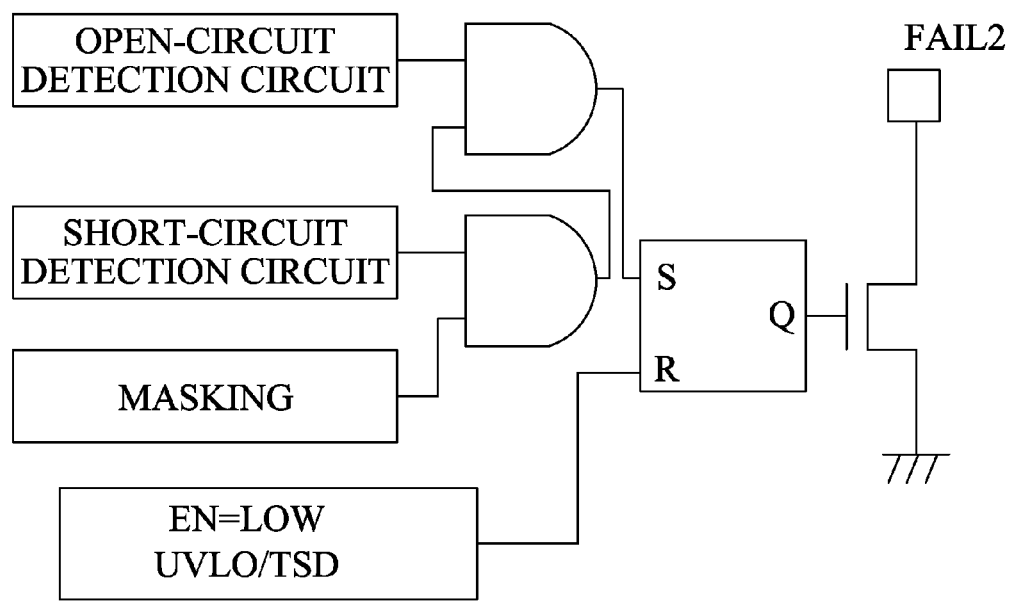
FIG. 4 is a block diagram illustrating output functions of FAIL2.

FIG. 3 is a block diagram illustrating output functions of FAIL1, and FIG. 4 is a block diagram illustrating output functions of FAIL2. The LED driver IC 100 outputs an action status of an inbuilt protection circuit of the IC to the FAIL1 terminal and the FAIL2 terminal (which are both in an open drain manner). The output signal of the FAIL1 terminal becomes a low level when any of the UVLO, TSD, OVP and SCP is actuated. The output signal of the FAIL2 terminal becomes a low level when any of the LED open-circuit detection or short-circuit detection is actuated.

<Protection Circuit Action>

The low voltage malfunction prevention circuit (the UVLO portion 102) shuts down circuits except for the internal constant voltage generation portion 101 when the input voltage Vin becomes less than 3.5 V or the internal constant voltage VREG becomes less than 2.0 V. The temperature protection circuit (the TSD portion 103) shuts down the circuits except for the internal constant voltage generation portion 101 when a junction temperature of the IC becomes higher than 175° C. Further, the TSD portion 103 restores the circuit action when the junction temperature of the IC becomes lower than 150° C. The OCP circuit (the OCP portion 106) detects a current flowing in a power FET (the transistor N1) to be used as a voltage signal by using the high-voltage side detection resistor R3, and performs the over current protection when the CS terminal voltage becomes lower than VCC-0.6 V. If the over current protection is performed, the SS terminal capacitor C6 is discharged, and the DC/DC switch is turned off. The OVP circuit (the OVP portion 104) detects the DC/DC output voltage Vout by using the OVP terminal voltage, and performs the over voltage protection when the OVP terminal voltage becomes higher than 2.0 V. If the over voltage protection is performed, the SS terminal capacitor C6 is discharged, and the DC/DC switch is turned off.

<Output Short-Circuit Protection Circuit>

The LED driver IC 100 has an inbuilt output short-circuit protection circuit (SCP) which is not shown in FIG. 1. In the output short-circuit protection circuit (SCP), if the LED terminal voltages VLED1 to VLED4 become lower than 0.3 V, an inbuilt counter is actuated, and after about 100 ms (when the FOSC is 2000 kHz), performs lockout to shut down the circuit. If the LED terminal voltages VLED1 to VLED4 become higher than 0.3 V within the 100 ms, the counter is restored. When the anode side (the DC/DC output end side) of the LED rows LED1 to LED4 has a ground failure, the output current ILED is cut off, and the LED terminal voltages VLED1 to VLED4 become a low level. Moreover, when a cathode side of the LED rows LED1 to LED4 has a ground failure, the LED terminal voltages VLED1 to VLED4 also become a low level. Therefore, the output short-circuit protection circuit (SCP) supports the ground failure protection for both the anodes and cathodes of the LED rows LED1 to LED4.

<LED Open-Circuit Detection Circuit>

In the LED open-circuit detection circuit (OPEN) of the open-circuit/short-circuit detection portion 122, when the LED terminal voltages VLED1 to VLED4 become lower than 0.3 V and the OVP terminal voltage is higher than 1.7 V, the LED open-circuit detection is performed, and only the open-circuit LED row is turned off by the lockout.

<PWM Off Detection Circuit>

The logic control portion 105 has a PWM off detection portion for switching the LED driver IC 100 to a power-saving mode (a sleep mode) when it is determined that the external PWM signal remains at a low level for a predetermined period. Through such a structure, the LED driver IC 100 can save power. Further, after the enable signal input to the EN terminal is set to a high level (the logic level during enabling), the inbuilt counter of the logic control portion 105 is actuated, and after about 100 ms (when the FOSC is 2000 kHz), the PWM off detection circuit is enabled to perform actions.

<Output Voltage Discharging Circuit>

The LED driver IC 100 has an output voltage discharging circuit (not shown in FIG. 1). Through connecting the VDISC terminal to the applied end of the output voltage Vout, when the DC/DC controller block is shut down according to the enable signal and various protection actions, the residual charges of the capacitor C3 can be discharged quickly, thereby preventing the LED rows LED1 to LED4 from flickering.

<LED Short-Circuit Detection Portion>

In the LED short-circuit detection circuit (SHORT) of the open-circuit/short-circuit detection portion 122, when the LED terminal voltages VLED1 to VLED4 are higher than 4.5 V and the OVP terminal voltage is lower than 1.6 V, the inbuilt counter is actuated, and after about 100 ms (when the FOSC is 300 kHz), performs lockout, and only the LED row where the short-circuit is detected is turned off by the lockout. During the PWM dimming that the external PWM signal is at a high level, the LED short-circuit detection action is valid, and in this manner, the LED short-circuit detection signal is masked (referring to FIG. 4). When the LED short-circuit detection is finished, after about 100 ms (when the FOSC is 300 kHz), the circuit is turned off through lockout. If an LED short-circuit detection condition is released within the 100 ms, the counter is restored. The frequency of the counter is determined by using the RT terminal, and the counter performs lockout at the count of 32770.

Further, when the forward voltage drops VF of the LED rows LED1 to LED4 are of significant non-uniformity, the LED short-circuit detection can have malfunction. Therefore, when the LED short-circuit detection function is not performed, through setting the SHDETEN terminal to a high level (VREG) before the LED driver IC 100 is started, the short-circuit detection function can be turned off (disabled). In another aspect, through setting the SHDETEN terminal to a low level (the GND short-circuit or open-circuit status), the LED short-circuit detection function is turned on (enabled). However, during the action of the LED driver IC 100, the H/L switching of the SHDETEN terminal should be avoided.

<About all Failure Conditions>

FIG. 5 is a list of protection functions of the LED driver IC 100. An UVLO detection condition is that Vin<3.5 V or VREG<2.0 V, and an UVLO release condition is that Vin>4.0 V and VREG>3.5 V. The action during the UVLO detection is shutdown of all blocks (except REG). A TSD detection condition is that Tj>175° C., and a TSD release condition is that Tj<150° C. The action during the TSD detection is shutdown of all blocks (except REG). An OVP detection condition is that VOVP>2.0 V, and an OVP release condition is that VOVP<1.45 V. The action during the OVP detection is extracting charges (discharge) of the SS terminal. An OCP detection condition is that VCS<VCC−0.6 V, and an OCS release condition is that VCS>VCC−0.6 V. The action during the OCP detection is extracting charges (discharge) of the SS terminal. An SCP detection condition is that VLED1 to VLED4<0.3 V (100 ms delay, 300 kHz), and an SCP release condition is an EN input or the UVLO release. The action during the SCP detection is to delay turning off the lockout of the counter after counting for a predetermined period (except the REG). An LED open-circuit protection detection condition is that VLED1 to VLED4<0.3 V and VOVP>1.7 V, and an LED open-circuit protection release condition is the EN input or the UVLO release. The action during the LED open-circuit protection detection is only detecting an LED channel turned off (turning off the lockout). An LED short-circuit protection detection condition is that VLED1 to VLED4>4.5 V and VOVP<1.6 V, and an LED short-circuit protection release condition is the EN input or the UVLO release. The action during the LED short-circuit protection detection is only detecting the LED channel turned off (the timer delays turning off the lockout).

<Protection Sequence>

Figure 6:
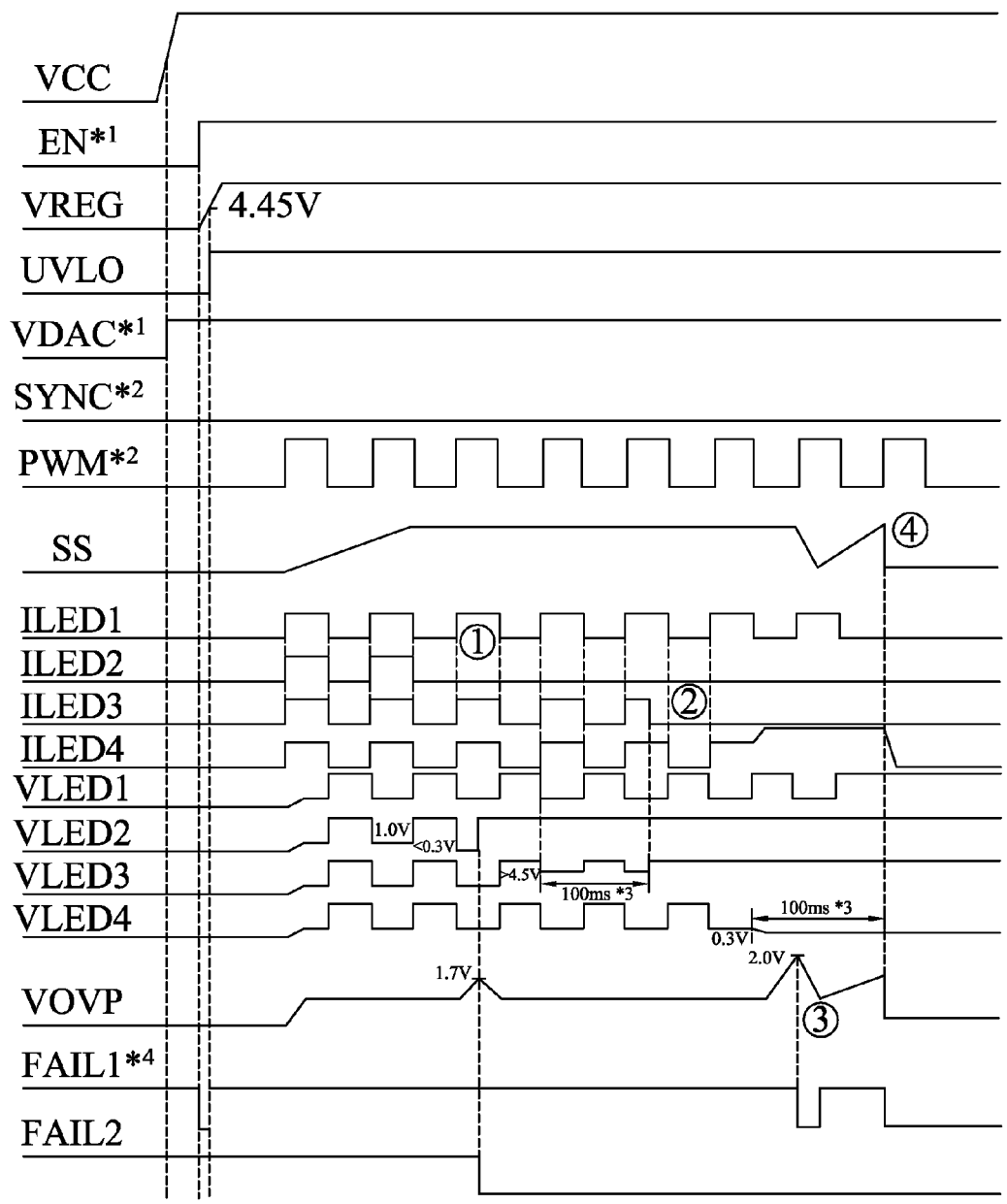
FIG. 6 is a timing diagram illustrating a protection sequence.

FIG. 6 is a timing diagram illustrating a protection sequence. About (*1), it is desirable that when the VCC is connected and reaches an action voltage range, the voltage of the VDAC is fixed, and then the EN is connected. About (*2), it is desirable that the PWM and SYNC are connected while VREG>4.6 V. A sequence for connecting the PWM and the SYNC is not limited. About (*3), when FOSC=2000 kHz, a delay of about 100 ms is generated. About (*4), a situation in which the FAIL1 terminal is pulled up with an external voltage is depicted.

A situation in which the LED2 terminal is in an open-circuit mode is depicted as symbol 1̂. When it is detected that VLED2<0.3 V and VOVP>1.7 V, the LED2 is turned off, and the FAIL2 becomes a low level.

A situation in which the LED3 terminal is in a short-circuit mode is depicted as symbol 3̂. About 100 ms after it is detected that VLED3>4.5 V and VOVP<1.6 V, the LED3 is turned off.

A situation in which the LED4 terminal is in a GND short-circuit mode is depicted as symbol 3̂. If it is detected that the Vout rises and VOVP>2.0 V, the SS terminal voltage is extracted, and the FAIL1 is set to a low voltage. Moreover, 100 ms after it is detected that VLED4<0.3 V, shutdown is performed.

<Block Diagram (Second Structural Embodiment)>

Figure 7:
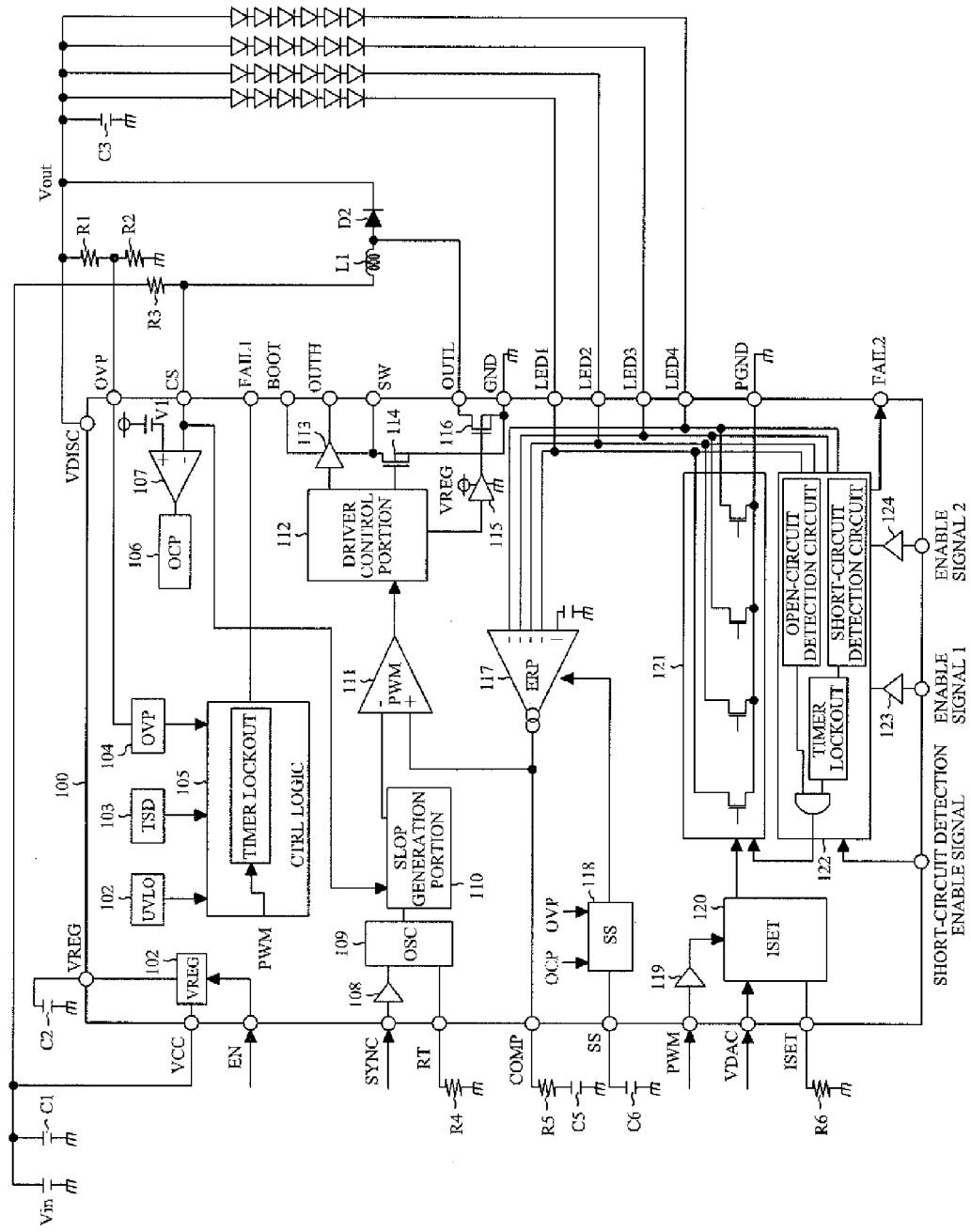
FIG. 7 is a circuit block diagram of a second structural embodiment of an LED driver IC (boost application structural embodiment)

FIG. 7 is a circuit block diagram of a second structural embodiment of an LED driver IC 100 (boost application structure). In the second structural embodiment, in order to implement the boost application, the transistor N1, the diode D1 and the capacitor C4 in FIG. 1 are dismounted, and the inductor L1 is directly connected to the resistor R3.

<Block Diagram (Third Structural Embodiment)>

Figure 8:
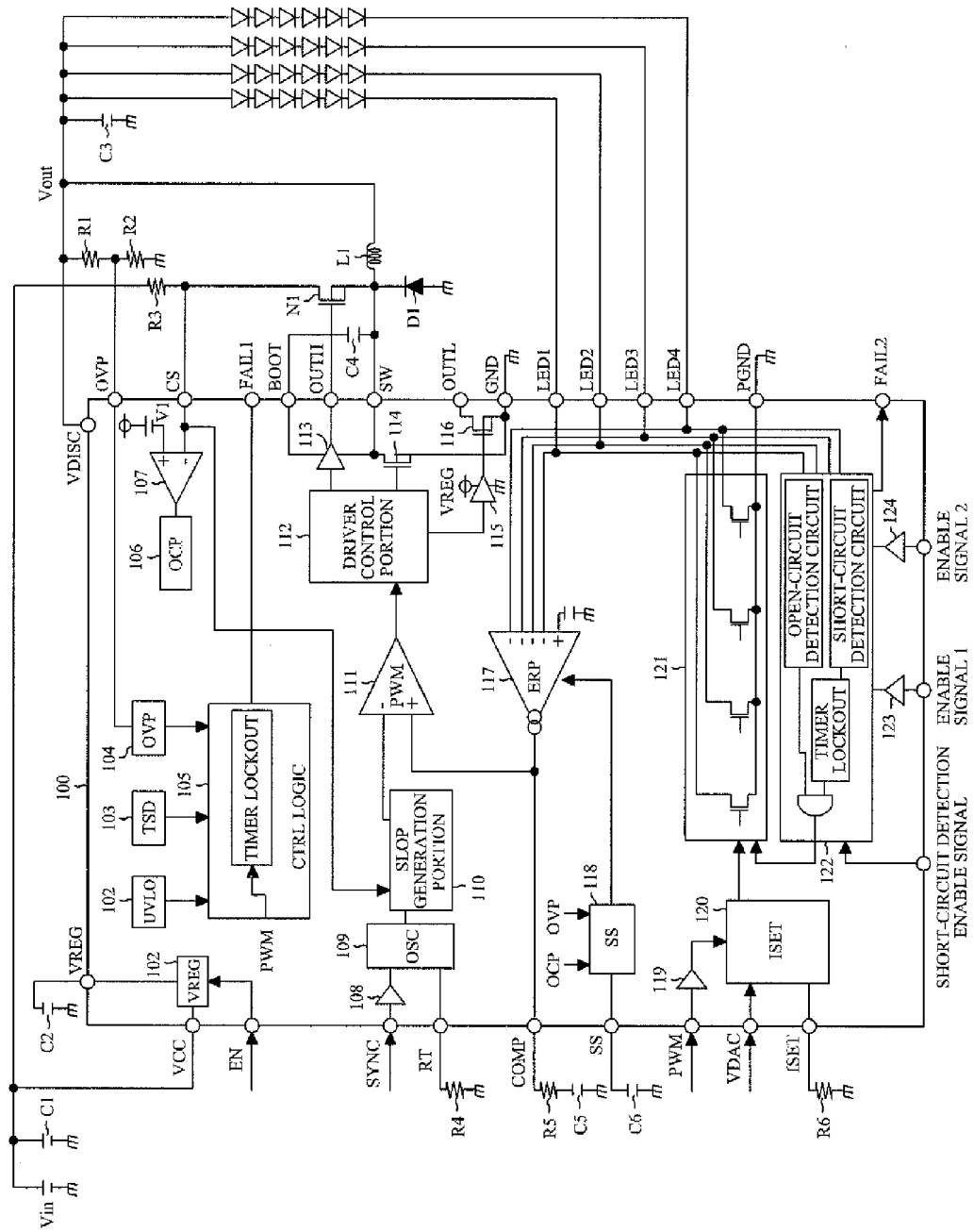
FIG. 8 is a circuit block diagram of a third structural embodiment of an LED driver IC (buck application structural embodiment)

FIG. 8 is a circuit block diagram of a third structural embodiment of an LED driver IC 100 (buck application structure). In the third structural embodiment, in order to implement the buck application, the diode D2 in FIG. 1 is dismounted, and the OUTL terminal is set to be an open-circuit.

<LCD Device>

Figure 9:
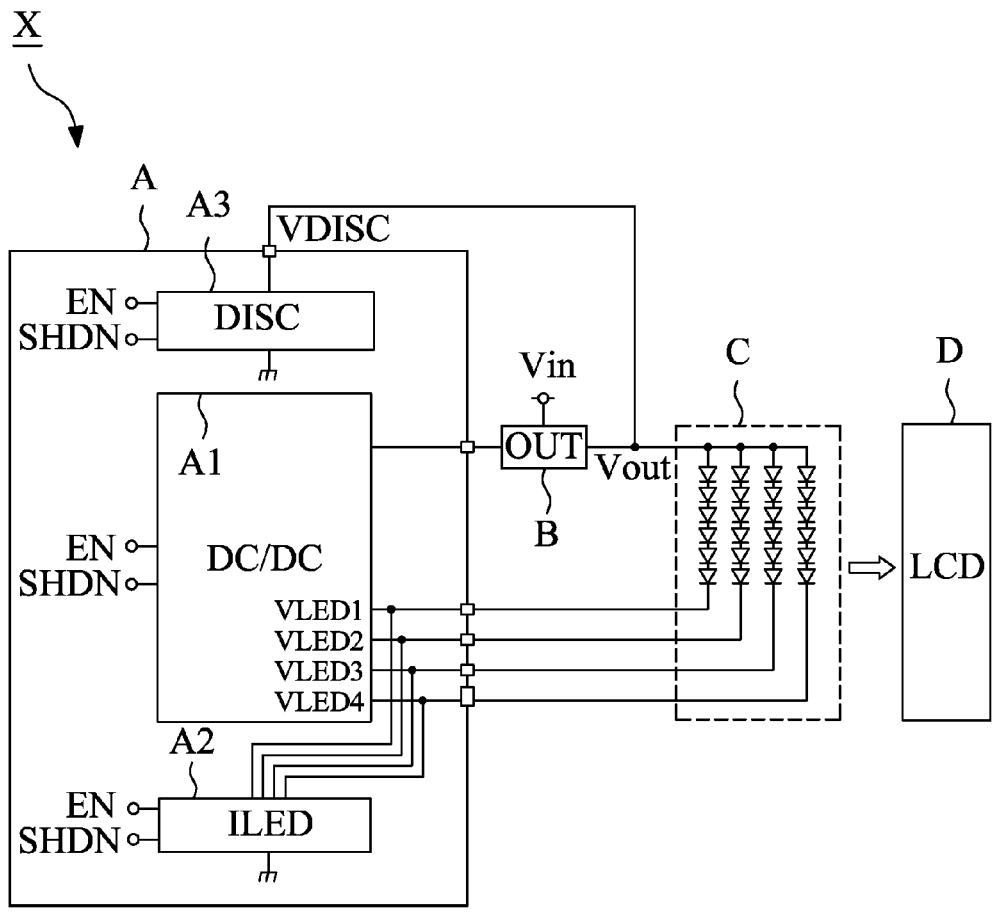
FIG. 9 is a block diagram of a first implementation manner of an LCD device.

FIG. 9 is a block diagram of a first implementation manner of an LCD device. The LCD device X of the first implementation manner includes an LED driving device A, an output segment B, an LED backlight device C, and an LCD panel D.

The LED driving device A is equivalent to a semiconductor IC device of the foregoing LED driver IC 100, and the LED driving device A includes a DC/DC controller A1, an output current driver A2 and an output discharging circuit A3.

The output segment B generates an output voltage Vout from an input voltage Vin and supplies the output voltage Vout to a discrete circuit of the LED backlight device C. The output segment B can be any of a boost/buck type (FIG. 1), a boost type (FIG. 7), and a buck type (FIG. 8).

The LED backlight device C is an LED array of multiple LED components in series connection or parallel connection (in FIG. 9, the array is 6 sections of series connection×4 rows of parallel connection), and illuminates the LCD panel D from the back.

The LCD panel D is an image output mechanism that uses liquid crystal components having light transmittance changing along with image signals as pixels.

The DC/DC controller A1 controls the output segment B so that a lowest value of LED terminal voltages VLED1 to VLED4 input from the LED backlight device C is consistent with a predetermined reference voltage Vref. The DC/DC controller A1 is equivalent to the DC/DC controller block of the LED driver IC 100 (FIG. 1) (which includes circuit blocks of the oscillation portion 109, the slope generation portion 110, the PWM comparator 111, the driver control portion 112, the upper controller 113, the transistor 114, the lower controller 115, the transistor 116, the error amplifier 117, and the slow start portion 118), and the actions of the DC/DC controller A1 are described above, and are not described herein again. Further, the DC/DC controller A1 determines whether to generate the output voltage Vout based on an enable signal EN and a shutdown signal SHDN.

The output current driver A2 generates an output current ILED of the LED backlight device C. The output current driver A2 is equivalent to the output current driver 121 in the LED driver IC 100 (FIG. 1), and the actions of the output current driver A2 are described above, and so are not described herein again. Further, the output current driver A2 determines whether to generate the output current ILED based on the enable signal EN and the shutdown signal SHDN.

The output discharging circuit A3 performs discharging of the output voltage Vout when the generation action of the output voltage Vout and the output current ILED based on the enable signal EN and the shutdown signal SHDN stops.

Figure 10:
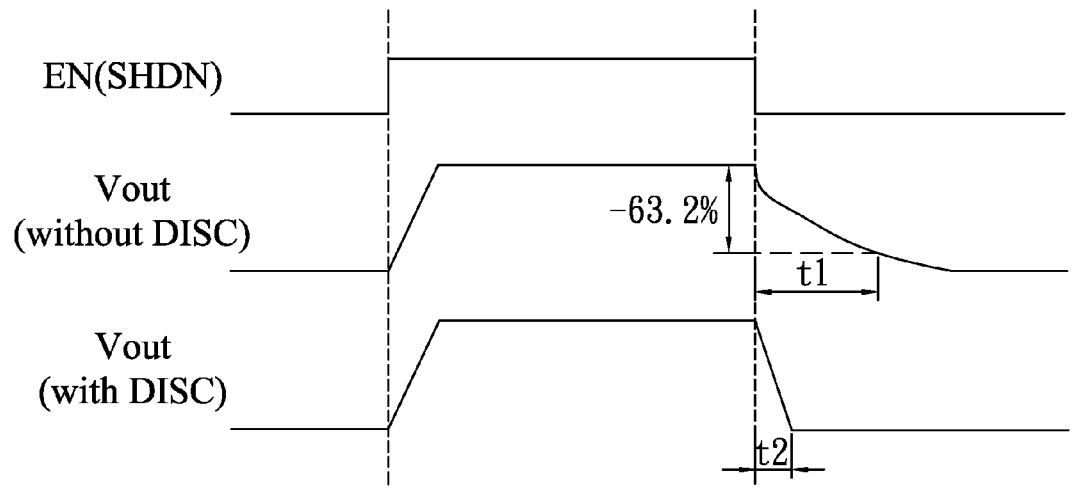
FIG. 10 is a timing diagram of an action example of an output discharging circuit A3.

FIG. 10 is a timing diagram of an action example of the output discharging circuit A3, in which the enable signal EN (or the shutdown signal SHDN), the output voltage Vout during natural discharging, and the output voltage Vout during output discharging are depicted from top to bottom in sequence.

In the structure of the prior art for performing the natural discharging of the output voltage Vout, when the generation action of the output voltage Vout based on the enable signal EN (or the shutdown signal SHDN) stops, time of the order of several seconds is required to serve as a discharging time t1 for decreasing the output voltage Vout from a target voltage value to a predetermined value (−63.2%). Therefore, when the LED driving device A is shut down, the LED backlight device C can give out light unexpectedly due to the residual output voltage Vout. In particular, when the shutdown and automatic restoration of the LED driving device A are repeatedly performed during a short period, the LED backlight device C can repeatedly give out light unexpectedly, and so the LED backlight device C can flicker.

Accordingly, in the structure having the output discharging circuit A3, when the generation action of the output voltage Vout based on the enable signal EN (or the shutdown signal SHDN) stops, the output voltage Vout can be discharged quickly in a discharging time t2 of the order of several milliseconds. Therefore, the LED backlight device C is prevented from giving out light unexpectedly or flickering.

Figure 11A:
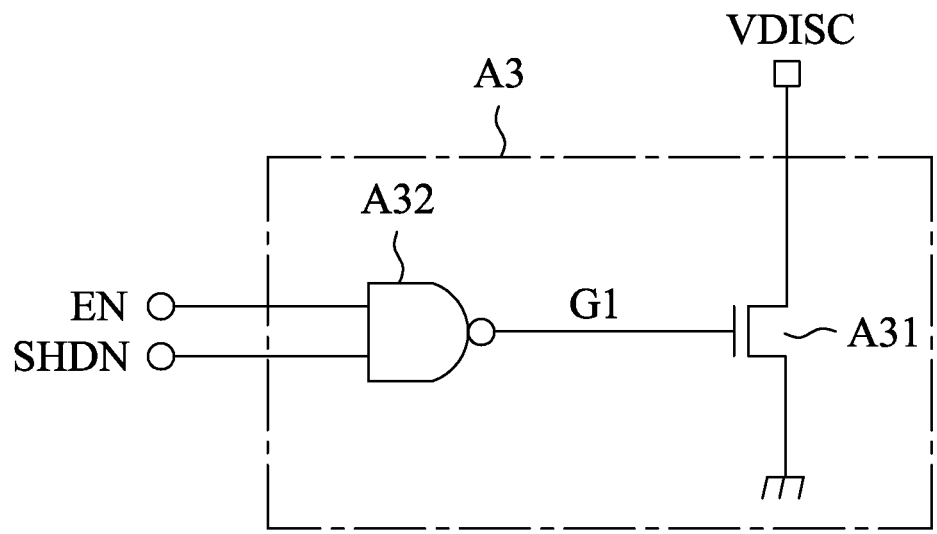
FIG. 11A is a circuit diagram of a first structural embodiment of the output discharging circuit A3.

FIG. 11A is a circuit diagram of a first structural embodiment of the output discharging circuit A3. The output discharging circuit A3 of the first structural embodiment includes an N-channel MOS FET A31 and an NAND gate A32. A drain of the transistor A31 is connected to a VDISC terminal (an applied end of an output voltage Vout). A source of the transistor A31 is connected to a ground end. A gate of the transistor A31 is connected to an output end of the NAND gate A32. A first input end of the NAND gate A32 is connected to an applied end of an enable signal EN. A second input end of the NAND gate A32 is connected to an applied end of a shutdown signal SHDN (equivalent to the failure signal FAIL1 or failure signal FAIL2).

Under the circumstance that both the enable signal EN and the shutdown signal SHDN rise to a high level (a logic level during enabling/non-shutdown), a gate signal G1 output from the NAND gate A32 turns to a low level, and so the transistor A31 is turned off, and the VDISC terminal is disconnected from the ground end. Therefore, the output voltage Vout is not discharged, and is provided to an LED backlight device C.

In another aspect, under the circumstance that any either the enable signal EN or the shutdown signal SHDN becomes a low level (a logic level during disabling/shutdown) from high level (the logic level during enabling/non-shutdown), the gate signal G1 output from the NAND gate A32 becomes a high level, and so the transistor A31 is turned on, and the VDISC terminal is connected to the ground terminal. Therefore, the output voltage Vout is discharged quickly. Further, in the output discharging circuit A3 of the first structural embodiment, the output voltage Vout is discharged based on a capacitance value of an output capacitor in the output segment B and a time constant corresponding to an on-resistance value of the transistor A31.

Figure 11B:
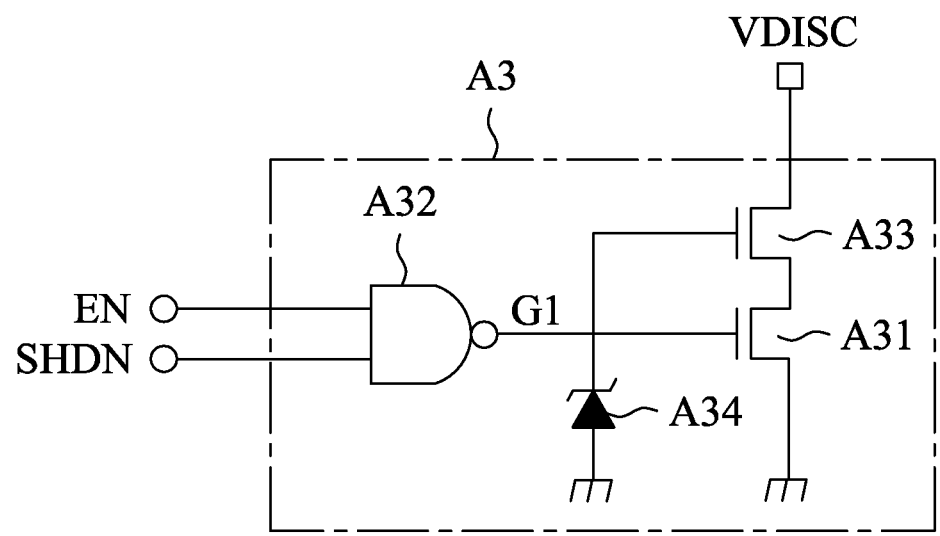
FIG. 11B is a circuit diagram of a second structural embodiment of the output discharging circuit A3.

FIG. 11B is a circuit diagram of a second structural embodiment of the output discharging circuit A3. The output discharging circuit A3 of the second structural embodiment includes basically the same structure as the first structural embodiment, while the characteristic aspect lies in that an N-channel FET A33 and a Zener diode A34 are added.

The transistor A33 is inserted between the VDISC terminal and a drain of the transistor A31, so that a drain voltage of the transistor A31 is biased. If a specific connection relationship is described, a drain of the transistor A33 is connected to the VDISC terminal. A source of the transistor A33 is connected to the drain of the transistor A31. A gate of the transistor A33 is connected to a gate of the transistor A31.

The Zener diode A34 is inserted between the gate of the transistor A31 and the ground end, and a gate voltage of the transistor A31 is clamped to a Zener breakdown voltage (for example, 5 V). If a specific connection relationship is described, a cathode of the Zener diode A34 is connected to the gate of the transistor A31. An anode of the Zener diode A34 is connected to the ground end.

In the output discharging circuit A3 of the second structural embodiment, when the output voltage Vout is discharged (the gate signal G1 is at a high level), a voltage between the gate and source of the transistor A31 can be fixed at 5 V, and a voltage between the drain and source of the transistor A31 can be fixed at 5 V-Vth (in which Vth is a drop voltage between the gate and source of the transistor A33). Therefore, in the output discharging circuit A3 of the second structural embodiment, the discharging current can remain at a fixed value, so that the output voltage Vout is discharged based on a linear feature (referring to FIG. 10).

Compared with the first structural embodiment of performing CR discharge, the second structural embodiment of performing linear discharge is capable of rapidly discharging micro charges output from the capacitor, and therefore can quickly and correctly black out the LED backlight device C.

Figure 12:
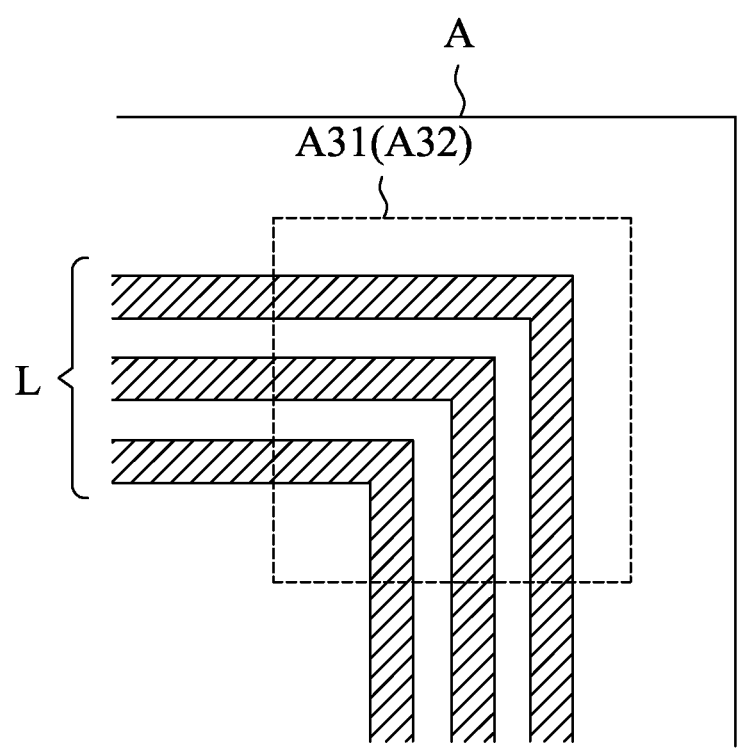
FIG. 12 is a plan view of a stacking example of a transistor A31 and a wiring layer L.

FIG. 12 is a plan view of a stacking example of the transistor A31 and a wiring layer L. The transistors A31 and A32 are switch components for connecting/disconnecting a discharging path of the output voltage Vout, and its particular features are not essential. Therefore, as shown in FIG. 12, in the LED driving device A, an upper layer of at least one of the transistors A31 and A32 is stacked with the wiring layer L. Through such a structure, the layout of the wiring layer L can be more flexible.

Figure 13:
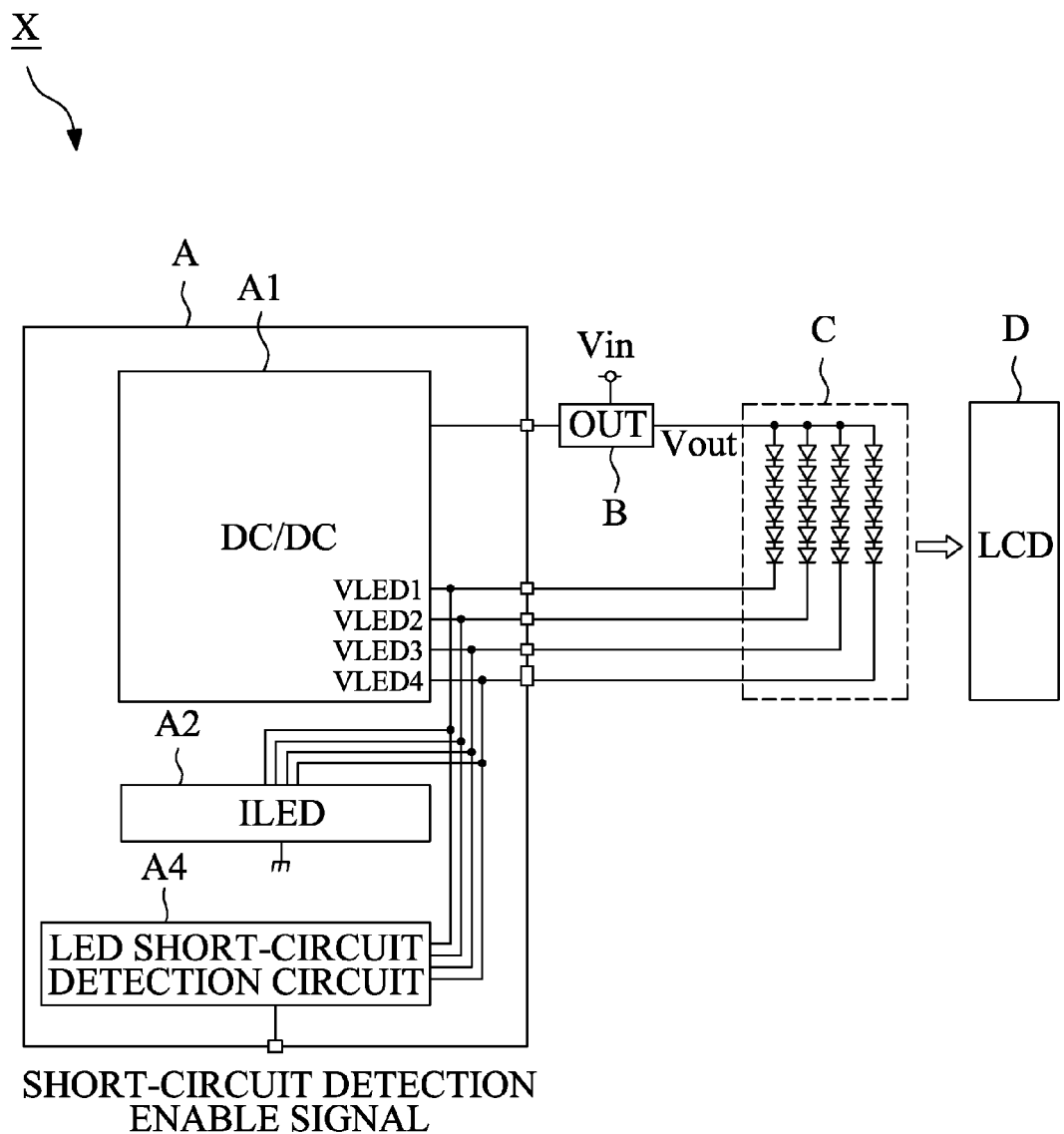
FIG. 13 is a block diagram of a second implementation manner of an LCD device.

FIG. 13 is a block diagram of a second implementation manner of an LCD device. The LCD device X of the second implementation manner includes basically the same structure as the first implementation manner, while the characteristic aspect lies in an LED short-circuit detection circuit A4 integrated on the LED driving device A. Therefore, structural elements the same as the first implementation manner are marked with the same symbols as in FIG. 9, the details of which will not be repeated herein, while the characteristic aspects of the second implementation manner are highlighted hereinafter.

The LED short-circuit detection circuit A4 is a circuit block (equivalent to a part of the open-circuit/short-circuit detection portion 122 in FIG. 1) that monitors LED terminal voltages VLED1 to VLED4 fed back from a cathode of the LED backlight device C and performs the LED short-circuit detection.

However, when forward voltage drops VF1 to VF4 of the LED rows that form the LED backlight device C are of significant non-uniformity, the LED short-circuit detection can malfunction. For example, for the forward voltage drop VF of the LED component, the following situation is considered: a specification value is set to 3.5 V, non-uniformity is set to ±0.5 V, and a reference voltage Vref for comparison with the LED terminal voltages VLED1 to VLED4 is set to 1.0 V.

In such a situation, if all the forward voltage drops VF of six LEDs forming the first LED row occur non-uniformity at a smaller side (3.0 V), a total forward voltage drop VF1 required for driving the six LEDs to emit light is 18 V (18 V=3.0 V×6 segments). In another aspect, if all the forward voltage drops VF of six LEDs forming the second LED row occur non-uniformity at a larger side (4.0 V), a total forward voltage drop VF2 required for driving the six LEDs to emit light is 24 V (24 V=4.0 V×6 segments). That is to say, a difference between the forward voltage drop VF1 of the first row and the forward voltage drop VF2 of the second row is 6 V.

If all the forward voltage drops VF of LEDs forming the third and fourth LED rows are specification value, the DC/DC controller A1 performs feedback control of the output voltage Vout, so that the LED terminal voltage VLED2 of the second row is consistent with the reference voltage Vref (which is equal to 1.0 V). Therefore, the output voltage Vout is 25 V (25 V=1.0 V+24 V), and the LED terminal voltage VLED1 of the first row is 7 V (7 V=25 V−18 V).

If any of the LED terminal voltages VLED1 to VLED4 is higher than a threshold voltage Vth (for example, 4.5 V), the LED short-circuit detection circuit A4 determines that the LED short-circuit has occurred, in which case it is determined erroneously that the first LED row is short-circuited.

Therefore, the LED short-circuit detection circuit A4 controls whether an action is performed or not according to a short-circuit detection enable signal SHDETEN input from outside the LED driving device A. Specifically, the LED short-circuit detection circuit A4 makes the short-circuit detection action valid when the short-circuit detection enable signal SHDETEN is at a low level (a logic level during enabling), and makes the short-circuit detection action invalid when the short-circuit detection enable signal SHDETEN is at a high level (a logic level during disabling).

Through such a structure, under the circumstance that the forward voltage drops VF of the LEDs forming the LED backlight device C have significant non-uniformity (for example, the LED backlight device C is a cheap model from an emerging country), the short-circuit detection enable signal SHDETEN is predetermined to a high level (the logic level during disabling) to prevent malfunction in detection of LED short-circuit.

Figure 14A:
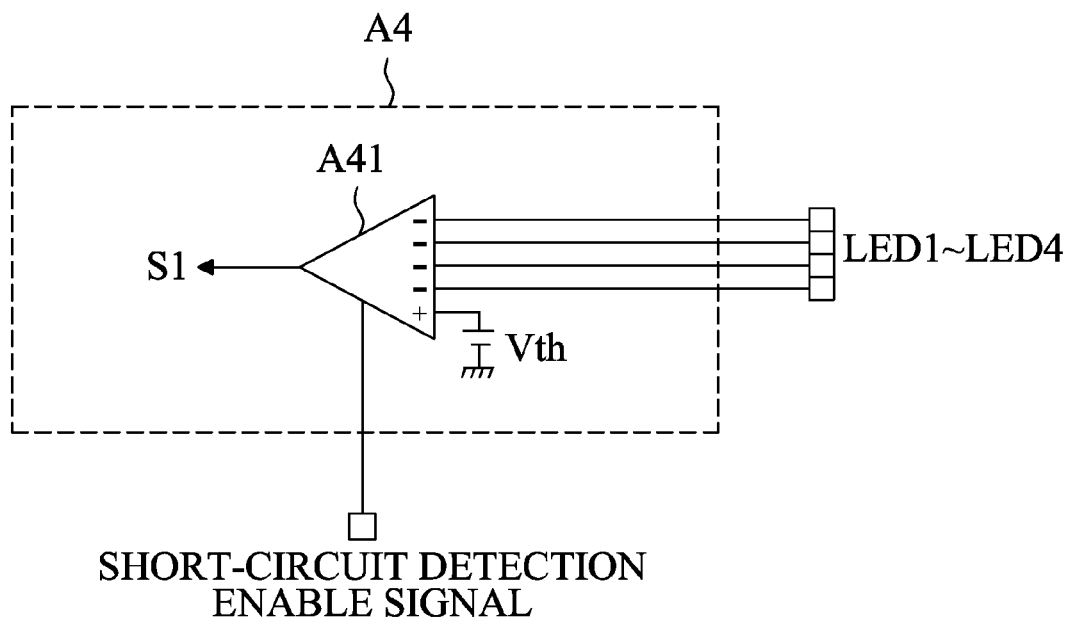
FIG. 14A is a circuit diagram of a first structural embodiment of an LED short-circuit detection circuit A4.

FIG. 14A is a circuit diagram of a first structural embodiment of the LED short-circuit detection circuit A4. The LED short-circuit detection circuit A4 of the first structural embodiment compares LED terminal voltages VLED1 to VLED4 applied to a non-inverting input end (+) and a predetermined threshold voltage Vth applied to an inverting input end (−), to generate a comparison signal S1 (equivalent to the LED short-circuit detection signal). The comparison signal S1 becomes a low level (a normal logic level) when at least one of the LED terminal voltages VLED1 to VLED4 is higher than the threshold voltage Vth, and becomes a high level in other situations (a logic level during a failure).

Moreover, the comparator A41 controls whether the action is performed or not according to the short-circuit detection enable signal SHDETEN. Specifically, the comparator A41 performs the comparison action when the short-circuit detection enable signal SHDETEN is at a low level (a logic level during enabling), and in another aspect, constantly outputs the comparison signal S1 of the low level (the normal logic level) while not performing the comparison action when the short-circuit detection enable signal SHDETEN is at a high level (a logic level during disabling).

Figure 14B:
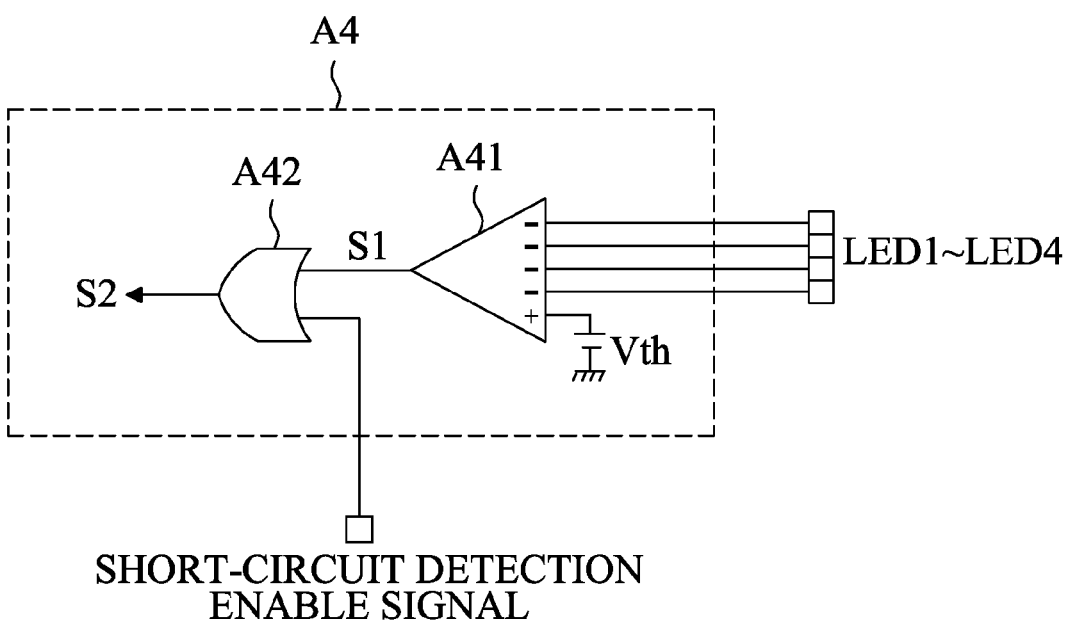
FIG. 14B is a circuit diagram of a second structural embodiment of an LED short-circuit detection circuit A4.

FIG. 14B is a circuit diagram of a second structural embodiment of the LED short-circuit detection circuit A4. The LED short-circuit detection circuit A4 of the second structural embodiment includes an OR gate A42 that masks the comparison signal S1 of the comparator A41 according to the short-circuit detection enable signal SHDETEN rather than controlling whether the action of the comparator A41 is performed or not by use of the short-circuit detection enable signal SHDETEN.

The OR gate A42 performs a logic sum operation on the comparison signal S1 and the short-circuit detection enable signal SHDETEN, thereby generating an output signal S2 (equivalent to the LED short-circuit detection signal). Therefore, the output signal S2 becomes the comparison signal S1 when the short-circuit detection enable signal SHDETEN is at the low level (the logic level during enabling), and constantly becomes the high level (the normal logic level) independent of the comparison signal S1 when the short-circuit detection enable signal SHDETEN is at the high level (the logic level during disabling).

<Other Variant Embodiments>

While several embodiments of the present invention have been illustrated and described, various modifications and improvements can be made by those skilled in the art. For example, the dipolar transistor and the MOS FET can be substituted for each other, and the logic level of various signals can be inverted at random. The embodiments of the present invention are therefore described in an illustrative but not in a restrictive sense. It is intended that the present invention should not be limited to the particular forms as illustrated and that all modifications which maintain the spirit and scope of the present invention are within the scope defined in the appended claims.

INDUSTRIAL APPLICABILITY

The LED driver IC of the present invention can be used as a light source driving mechanism for an LCD stereo, or a small-to-medium sized LCD panel.

What is claimed is:

1. A light emitting diode (LED) driving device, comprising:
    a direct current/direct current (DC/DC) controller configured to control an output segment that is used to generate an output voltage from an input voltage and supply the output voltage to an LED;
    an output current driver configured to generate an output current of the LED; and
    an LED short-circuit detection circuit configured to monitor a cathode voltage of the LED to perform an LED short-circuit detection;
    a short-circuit detection signal input terminal arranged to input a short-circuit detection enable signal, the short-circuit detection enable signal is used for controlling whether a LED short-circuit detection action is performed or not,
    wherein the LED short-circuit detection circuit controls whether or not an action is performed according to a short-circuit detection enable signal input from outside the LED driving device, and
    wherein the LED driving device supplies the output current to the LED without performing the LED short-circuit detection if the LED short-circuit detection circuit makes the action invalid according to the short-circuit detection enable signal.

2. The LED driving device according to claim 1, wherein the LED short-circuit detection circuit comprises a comparator, which compares the cathode voltage of the LED and a predetermined threshold voltage.

3. The LED driving device according to claim 2, wherein the comparator controls whether the action is performed or not according to the short-circuit detection enable signal.

4. The LED driving device according to claim 2, wherein the LED short-circuit detection circuit further comprises a logic gate, which masks an output signal of the comparator according to the short-circuit detection enable signal.

5. An illuminator, comprising:
    the LED driving device according to claim 1;
    the output segment; and
    the LED.

6. A liquid crystal display (LCD) device, comprising:
    an LCD panel; and
    the illuminator according to claim 5 that illuminates the LCD panel from the back.

7. The illuminator according to claim 5, wherein the LED comprises a plurality of LED rows, and each of the plurality of the LED rows comprises a plurality of LEDs connected in series, and the output voltage generated by the DC/DC controller determines the cathode voltages of the LED rows, and the cathode voltages of the LED rows equal to a maximized sum of the threshold voltages of the plurality of LED rows.

8. The LED driving device according to claim 1, further comprising an external terminal receiving the cathode voltage of the LED, wherein the output current driver and the LED short-circuit detection circuit are connected to the external terminal.

9. The LED driving device according to claim 1, wherein the DC/DC controller, the output current driver, and the LED short-circuit detection circuit are integrated.

* * * * *